United States Patent
Alms et al.

(10) Patent No.: US 6,649,405 B2
(45) Date of Patent: Nov. 18, 2003

(54) COMPOST TEA SYSTEM

(75) Inventors: Michael Alms, Eugene, OR (US);
Jeffrey Hilty, Eugene, OR (US);
Gregory Van Hoesen, Eugene, OR (US)

(73) Assignee: Growing Solutions, Inc., Eugene, OR (US)

( * ) Notice: Subject to any disclaimer, the term of this patent is extended or adjusted under 35 U.S.C. 154(b) by 77 days.

(21) Appl. No.: 09/847,893

(22) Filed: May 2, 2001

(65) Prior Publication Data

US 2002/0164781 A1 Nov. 7, 2002

(51) Int. Cl.⁷ ............................................... C12M 1/04
(52) U.S. Cl. ............................ 435/296.1; 435/296.1; 435/297.2; 435/243; 435/818; 71/9
(58) Field of Search ........................... 435/290.1, 290.2, 435/290.4, 289.1, 296.1, 299.1, 795.3, 243, 818, 797.2, 295.2; 99/322, 317; 261/122.2; 210/475, 477; 71/9

(56) References Cited

U.S. PATENT DOCUMENTS

| | | | | |
|---|---|---|---|---|
| 173,713 A | * | 2/1876 | Brewster | ...................... 99/317 |
| 3,997,634 A | * | 12/1976 | Downs | ...................... 261/122.2 |
| 5,171,687 A | * | 12/1992 | Moller et al. | ............ 435/309.1 |
| 6,168,949 B1 | | 1/2001 | Rubenberger | |
| 2002/0108498 A1 | * | 8/2002 | Huhn | .......................... 99/279 |

OTHER PUBLICATIONS

Ingham. "Making a high quality compost tea". Biocycle. Apr. 1999, pp. 94.*
Ingham. "What is compost tea?". Biocycle. Mar. 1999, pp. 74–75.*
Ingham, Elaine R., and Alms, Michael, *Compost Tea Manual 1.1*, circa 1999.
Ingham, Elaine R. *Brewing Compost Tea*, Kitchen Gardener magazine, Oct. / Nov. 2000.
Ingham, Elaine R.*Dr. Ingham's Talks on the Soil Foodweb* Dec., 1999, E–zine Issue #2, www.soilfoodweb.com.

* cited by examiner

Primary Examiner—William H. Beisner
(74) Attorney, Agent, or Firm—ipsolon llp

(57) ABSTRACT

A compost tea system uses a water-holding tank for containing process water. Compost is immersed into the water in the tank in baskets defining a filter media. Air is pumped into membrane disk diffuser modules in the tank and the liquid is sparged with fine bubbles to thoroughly agitate the liquid, extract nutrients and microorganisms from the compost, and to ensure a high concentration of dissolved oxygen in the liquid. The high level of oxygen selects for desired aerobic organisms to produce a rich compost tea. The finished tea is drained out of the tank and the tank and its components are easily cleaned and sanitized.

16 Claims, 4 Drawing Sheets

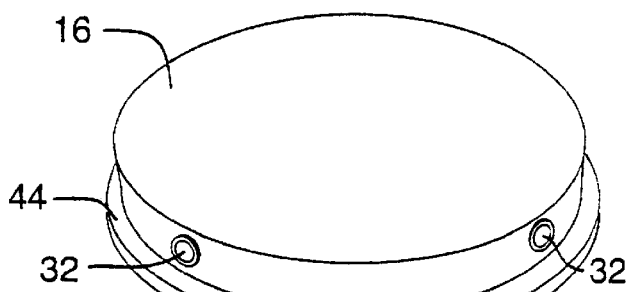
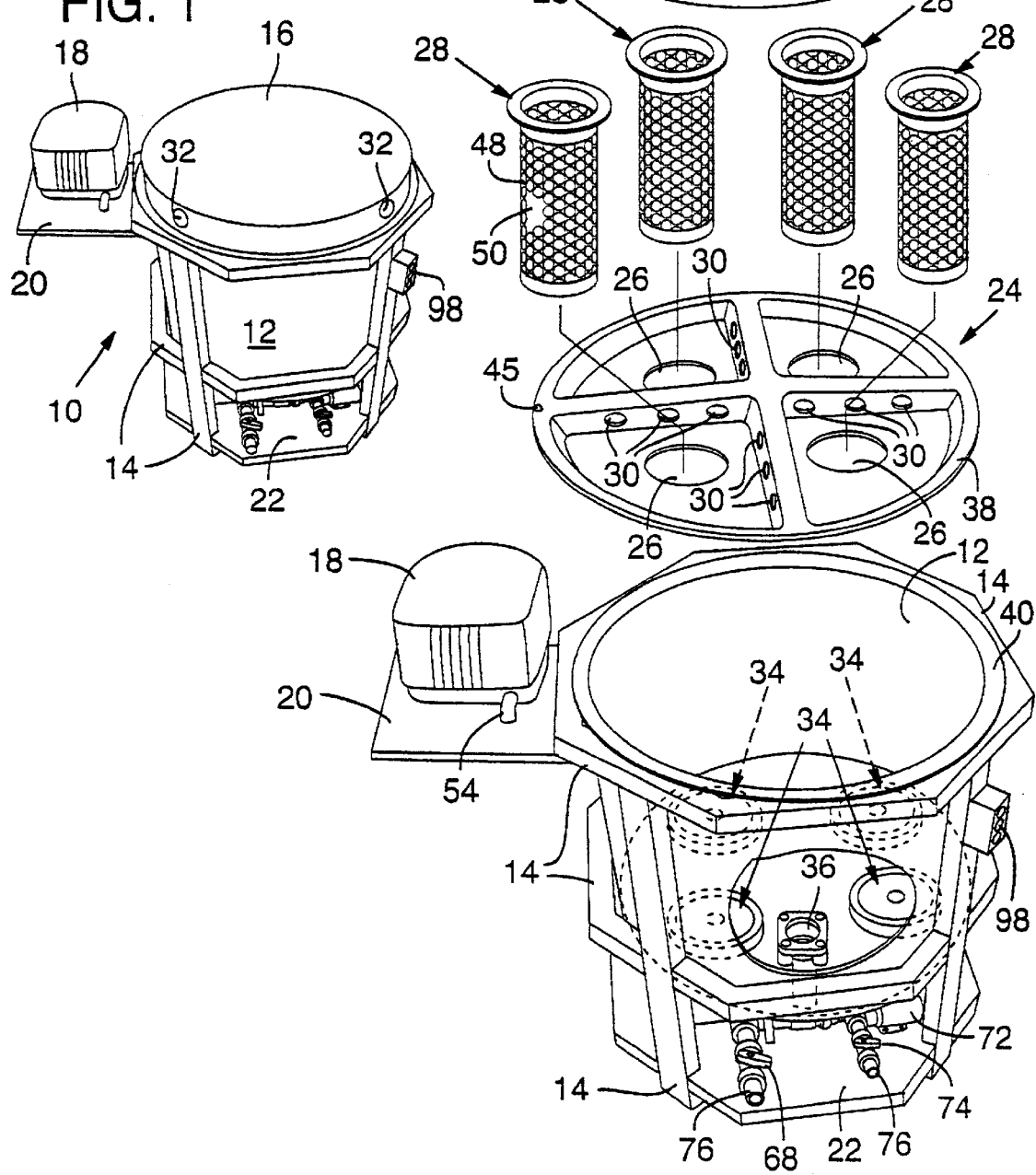

COMPOST TEA SYSTEM

FIELD OF THE INVENTION

This invention relates to compost tea, also known as compost extract, and more particularly, to apparatus and methods for producing compost tea.

BACKGROUND OF THE INVENTION

Compost teas are being used with increased frequency by both commercial agricultural enterprises and home gardeners for the many benefits they offer, such as control of root and foliar diseases via the action of beneficial microorganisms, and as a source that adds nutrients to plants and soil. Simply described, a compost tea is an aqueous extract of compost that is produced by extracting nutrients and microorganisms from compost. The extraction is often coupled with production aeration, agitation and microbial foods to increase the microbial density of the resulting extract—the tea. Some of the many benefits of compost teas have been recognized for many years. However, teas are becoming more and more recognized as important agricultural tools since they provide an alternative method of addressing such common agricultural concerns as disease control and nutrient supplementation. Among other benefits, compost tea generally provides an organic product that is economically manufactured and applied to crops and soil, and which allows the reduction or elimination of non-organic crop pesticides and fertilizers.

There are several known general methods of making compost teas—all of the methods rely upon high quality compost as a starting material to ensure a high quality extract. Various manufacturing techniques are used to leach a complex nutrient and microbiologically rich aqueous extract from the compost. The quality of the tea in terms of nutrient makeup and concentration and in terms of microbiological load and diversity depends to a large degree on the quality of the compost starting material, the food or nutrient package added to feed the microorganisms and on the method used to make the tea. Regardless of how it is made, liquid compost tea may be applied to plants in the form of a foliar spray, for instance to combat disease. Used in this way the tea provides an active method of controlling plant pathogens through mechanisms such as inhibition of spore germination, antagonism, and microbial competition with various plant pathogens. When applied as a spray, the tea also provides quickly usable nutritional supplements for the plant. Teas may also be applied directly to the soil to add nutrients to the soil and to increase the microbial density and diversity.

Given the complex microbial diversity found in high quality composts, and the rich nutrient makeup of composts, it is natural that compost teas have a similarly complex microbiological and macro, micro and trace element composition. The number and type of bacteria found in compost teas varies of course with many factors, including the bacterial species found in the starting compost, and the manner in which the tea is extracted. Thus, compost from a source such as animal manure will have a substantially different microbial load than compost derived from a plant origin, and a tea made from such composts will likewise have different microbial diversity. Nonetheless, and generally speaking, a high quality compost tea will be rich in aerobic bacteria, yeasts and fungi, as well as many varied nutrients. The methods of manufacturing the teas are designed to enhance the presence of such desirable components.

There are numerous methods of manufacturing compost teas, and the known methods involve both production of the liquid extract and aeration to ensure aerobic flora are selected and reproduce at a high rate. One of the simplest methods of making tea, and also one of the earliest reported methods involves covering compost with water, stirring the combination and allowing it to soak (and ferment) for a period of between 2 to 21 days. The liquid is then separated from particulate material by straining through cheesecloth and may be applied to crops and soil with ordinary spray equipment.

While this simple method produces an acceptable, low cost compost tea, it has been recognized that aerating the liquid to increase the concentration of dissolved oxygen in the liquid can enhance the growth of aerobic microorganisms and decrease tea production time production. One simple method of aeration is to create a trough by cutting a pipe in half lengthwise and drilling plural holes in the pipe to allow drainage. The pipe is laid on its side and is suspended over a tank. Compost is filled into bags such as burlap and laid in the trough. Water is then sprayed over the burlap. As the water filters through the compost it extracts nutrients and microbiological organisms. The water is circulated from the tank through the sprayers for several days. By spraying the liquid and by allowing it to drain through the trough the concentration of oxygen in the liquid increases, and this enhances the selection and growth of desirable aerobic microorganisms.

Not surprisingly, with the increased awareness that compost teas provide economical and organic alternatives to pesticides and fertilizers, more automated methods of manufacturing teas have been developed. These range from small devices that provide constant stirring and aeration of compost in water-filled tubs, to more complex devices such as the one described in U.S. Pat. No. 6,168,949. The "bioreactor" described in the '949 patent uses a tank having a conical bottom that holds the production liquid. The liquid is circulated through the tank by pumping it through the bottom and spraying it through an atomizing nozzle in the headspace above the liquid—called a vortex chamber. The finely divided spray produced by the atomizing nozzle allows for the introduction of gases in the headspace into the liquid—oxygen for instance.

These known methods of making compost tea are useful for making the product. However, there is a need for a compost tea system that is simple and which allows for the manufacture of high quality teas. The present invention provides a compost tea production apparatus that is simply constructed and simple to operate, and which provides a high quality tea rich in aerobic bacteria.

The tea system of the present invention uses a production tank that is filled with water that does not recirculate the water through a pump. Compost is introduced into the liquid in filter baskets suspended in the tank. Oxygen is introduced into the liquid through membrane disk diffusers positioned on the bottom of the tank. As air is pumped into the diffusers it is bubbled through the liquid in fine bubbles that have a high surface area to volume ratio. This causes both passive circulation of the liquid to ensure a homogenous blend of nutrients and constant turnover of the liquid, and maintains the concentration of dissolved oxygen in the liquid at a high level to encourage growth of desired aerobic organisms during the production cycle production. The entire production process is accomplished relatively quickly with the system of the present invention, and high quality compost teas may be produced within 24 hours.

BRIEF DESCRIPTION OF THE DRAWINGS

The invention will be better understood and its numerous objects and advantages will be apparent by reference to the following detailed description of the invention when taken in conjunction with the following drawings.

FIG. 1 is a top perspective view of an assembled compost tea producing apparatus according to the present invention.

FIG. 1A is a top perspective view of the compost tea producing apparatus shown in FIG. 1 with the component parts shown in exploded view and with a portion of the tank cut away to show the tank interior, and with some of the plumbing components shown in phantom lines.

DETAILED DESCRIPTION OF THE PREFERRED EMBODIMENTS

Figure 2:
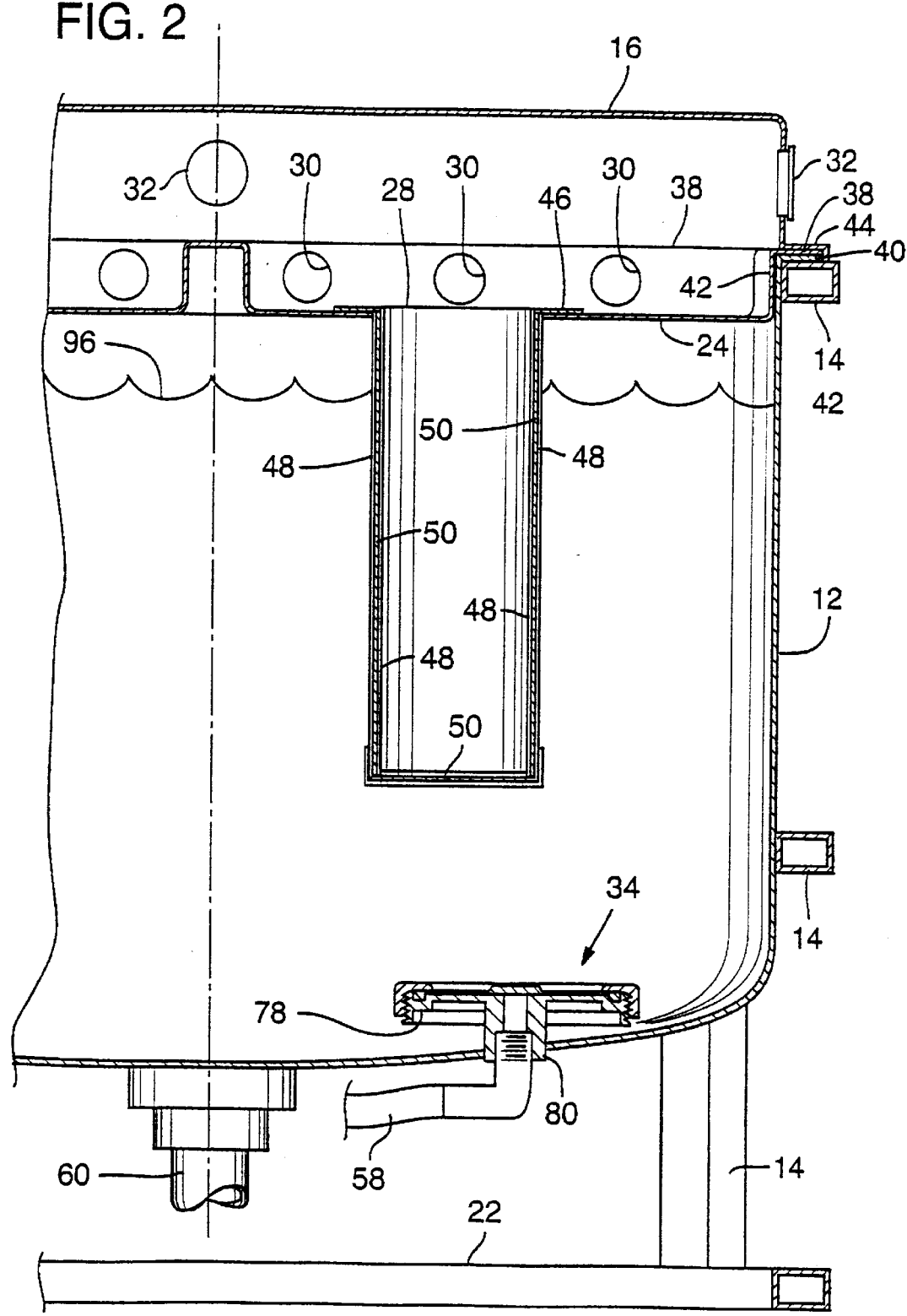
FIG. 2 is a partial cross sectional view taken of the compost tea producing apparatus of the present invention showing some of the tank interior and components.

Referring now to the drawings, and more specifically to FIGS. 1 and 1A, it will be seen that compost tea system 10 includes a fluid holding tank 12 that is supported by an external frame 14. A lid 16 covers the upper opening of tank 12, and as detailed below, system 10 includes a liquid plumbing system and an air plumbing system. Air is provided to the liquid contained in tank 12 with an air pump 18 that is supported by a shelf 20, located above the liquid level and connected to frame 14. The location of shelf 20 shown in the figures is exemplary of one embodiment only, and the shelf may be mounted to the tank itself or at other locations.

FIG. 1A shows some of the components of system 10 in an exploded view. Tank 12 may be of any appropriate size and shape, such as 100 gallons or more. It will be appreciated that the system 10 may be of much greater volume and capacity, or much less, depending upon the requirements of the particular user. In the preferred embodiment shown in the figures the tank is circular in cross section, but the tank could be of any cross sectional shape. Moreover, in the preferred embodiment the tank and other components are manufactured of a high quality, strong and easily cleaned ultra-violet resistant plastic. However, the tank and other components may be manufactured from other appropriate materials such as stainless steel and the like.

The tank is supported and surrounded by frame 14, which includes shelf 20 for holding air pump 18. The frame 14 shown in the figures is not necessary on all designs and is illustrated in herein as being representative of one model and size of system 10. For example, the tank may be designed to be self-supporting. Frame 14 supports tank 12 above a floor member 22 that is spaced apart from the bottom of tank 12 to provide room for various air and fluid plumbing fittings. A basket tray 24 covers the open upper end of tank 12 and includes plural openings 26, each of which receives a compost basket 28 such that the basket is suspended into the tank interior. Plural vents 30 are formed in basket tray 24 to ensure that the system is open to the atmosphere. Lid 16, which is sized to fit snugly over and cover basket tray 24 also includes plural vents 32 to ensure open circulation of atmospheric air into the interior of tank 12.

Turning now to the interior of tank 12, system 10 includes membrane disk diffuser modules 34 that are spaced around the interior bottom of the tank and around a central drain opening 36. Each of the membrane disk diffuser modules is fluidly plumbed to a source of air—air pump 18, and central drain opening 36 is fluidly plumbed to the liquid plumbing system. These connections are detailed below.

Various components of system 10 are detailed in FIG. 2. The tank preferably has a flat bottom fitted with a drain that allows for all fluid to drain from the tank. The tank itself, as noted, in the embodiment shown in the figures is supported by frame 14. Basket tray 24 includes an outwardly extending annular flange 38 that is sized to fit over the upper edge 40 of tank 12 and frame 14 to support the basket tray. Inwardly of annular flange 38 basket tray 24 has a downwardly extending annular side wall 42 that fits within the interior circumference of tank 12. In this way, basket tray 24 fits snugly onto tank 12 but is easily removed for cleaning and maintenance. Similarly, lid 16 includes an outwardly extending annular flange 44 that fits over annular flange 38.

Compost basket 28 comprises an annular flange 46 that is larger in size than opening 26 so that when the basket is assembled with tray 24, the basket is suspended into the tank interior. The basket includes an inner layer of mesh screen 48 and outer layer mesh screen 48, each of which has relatively large mesh openings, and an inner filter media 50 that has relatively smaller mesh openings sandwiched therebetween. The bottom plate of basket 28 is also open with holes that define a larger mesh opening than the mesh openings of filter medial 50. Filter media 50 is preferably a punched plastic material having appropriately sized openings (such as 20 mesh) for containing compost yet allowing rapid flow of water through the compost basket and easy cleaning. Filter media 50 is cylindrically shaped with a bottom so that it is sized to fit within the outer layer of mesh screen 48. Once filter media 50 is inserted into the basket, the inner layer of mesh screen 48 is inserted into the basket. Mesh screen 48 may be made from plastic or metal such as stainless steel. The inner layer of mesh screen 48 defines primary filter media for the compost, which is contained with the compost basket, and retains larger pieces of compost material. Filter media 50 defines a secondary filter media to retain relatively smaller pieces of compost particulate matter in the compost basket. The open bottom of basket 28 allows oxygen and agitation to occur through the bottom as well as the sides of the filter basket.

Figure 3:
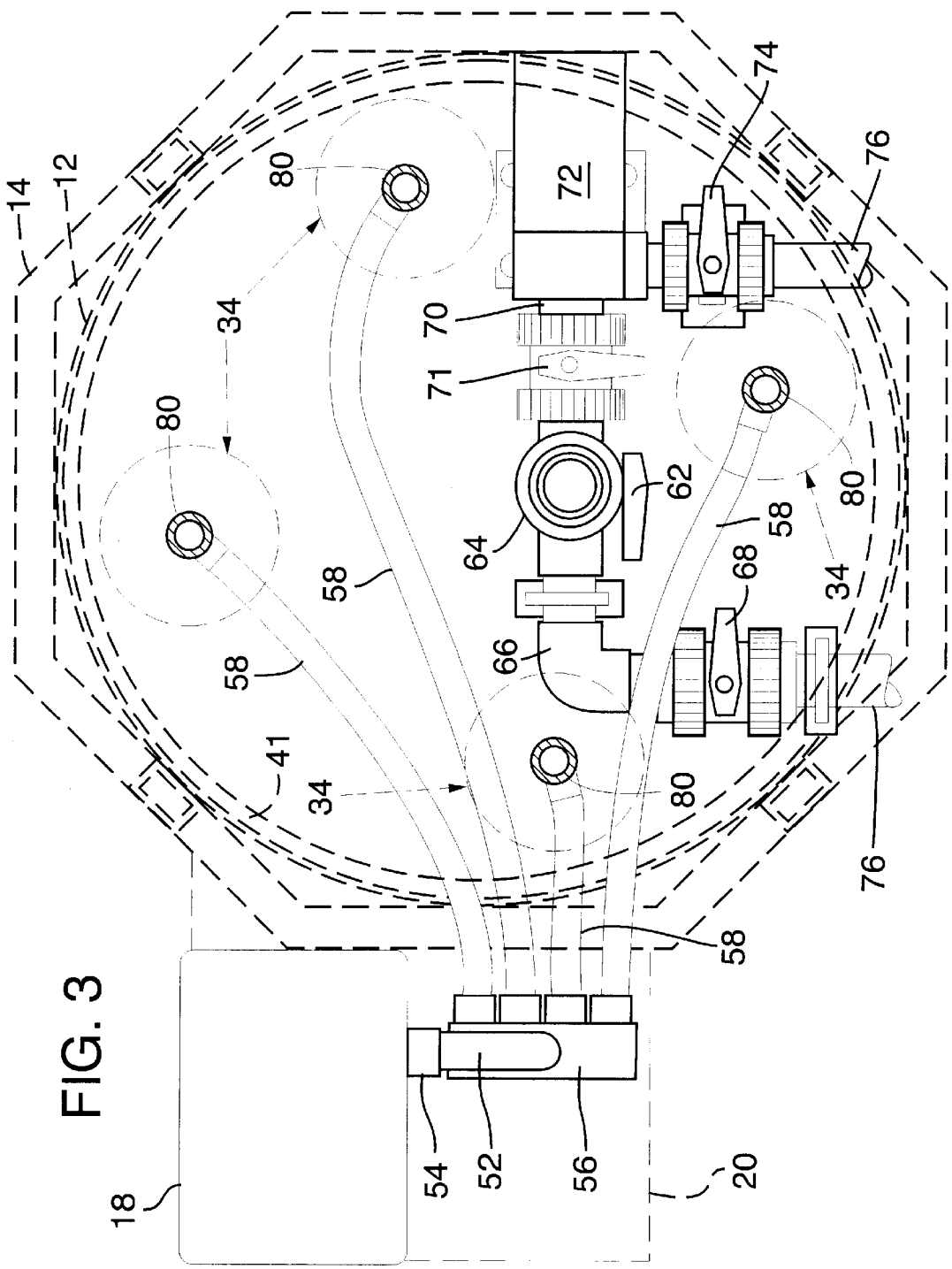
FIG. 3 is a top plan view of the compost tea producing apparatus showing the plumbing and air circulation system, and in which the tank and frame components are shown in phantom lines.

Plural membrane disk diffuser modules 34 are spaced around the interior of tank 12 and each is fluidly connected to air pump 18 through an air line 52. The number and placement of disk diffuser modules 34 is not critical and should be determined by the volume of the tank and by the amount of air that flows through the system. The liquid and air plumbing connections and systems are detailed in FIG. 3 and reference is now made to that figure. Beginning with the air plumbing connections, air line 52 extends from the outlet 54 on air pump 18 to a T-header 56 located near the bottom edge of the tank where the air line branches into four separate lines, one running to each of the diffuser modules. The air line is preferably fabricated from rigid tubing, such as PVC schedule 80 tubing or other appropriate materials. The air line preferably extends from pump 18 to individual diffuser module inlets on the outside of the tank.

The liquid plumbing connections include central drain opening 36, which is fluidly connected to a drain pipe 60 (FIG. 2). A first isolation valve 62 is positioned in drain pipe 60. Downstream of isolation valve 62 the drain pipe connects to an in-line filter (not shown) such as a 20 mesh glass bowl-type filter, which is removable for cleaning. The discharge piping then splits at a T-connection 64 into two fluid paths. The first fluid path is a passive discharge path is through pipe 66 and includes a valve 68. The second fluid path is an active discharge path through an water pump 72. Downstream of isolation valve 62, pipe 70 includes a valve 71 (such as a ball valve) and is connected to the water pump 72, the outlet of which is plumbed to a valve 74. Water pump 72 is a preferably an electric pump, but could be another type of pump if needed. It will be appreciated that the active discharge system is optional and is provided on systems having relatively large volume tanks and/or where a source of electric power is readily available. In all cases the passive discharge system is provided. The first fluid path allows for draining of the fluid from tank 12 by gravity when valves 62 and 68 are open and valve 74 is closed. The second fluid path allows for draining of fluid from tank 12 by action of pump 72 when valves 62 and 74 are open and valve 68 is closed. Each of the fluid paths for draining the tank includes an outlet 76 that may be fluidly connected with appropriate fittings to hoses and the like.

Figure 4:
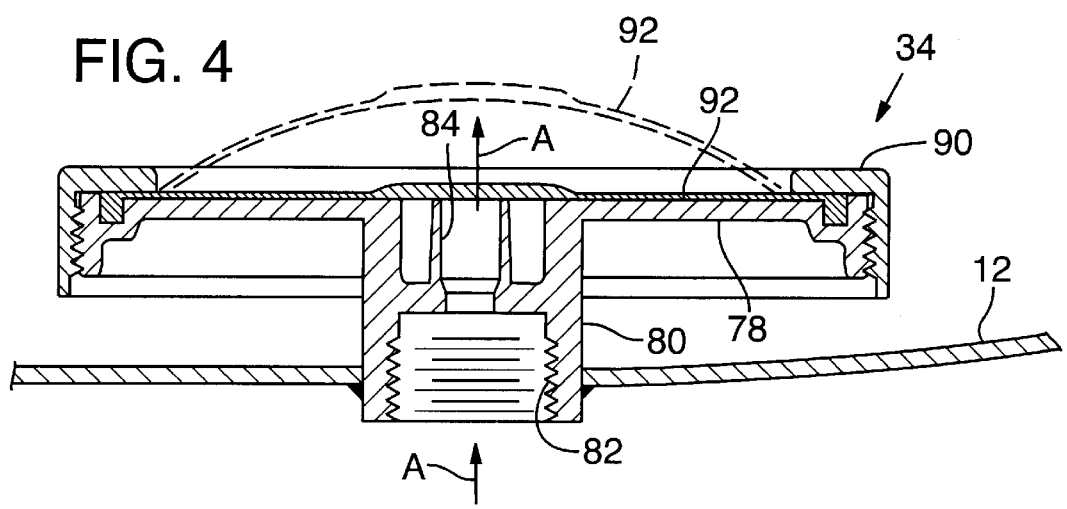
FIG. 4 is a detailed cross sectional view of a membrane disk diffuser used in the compost tea system FIG. 5. is an exploded perspective view of the unassembled membrane disk diffuser shown in FIG. 4.
Figure 5:
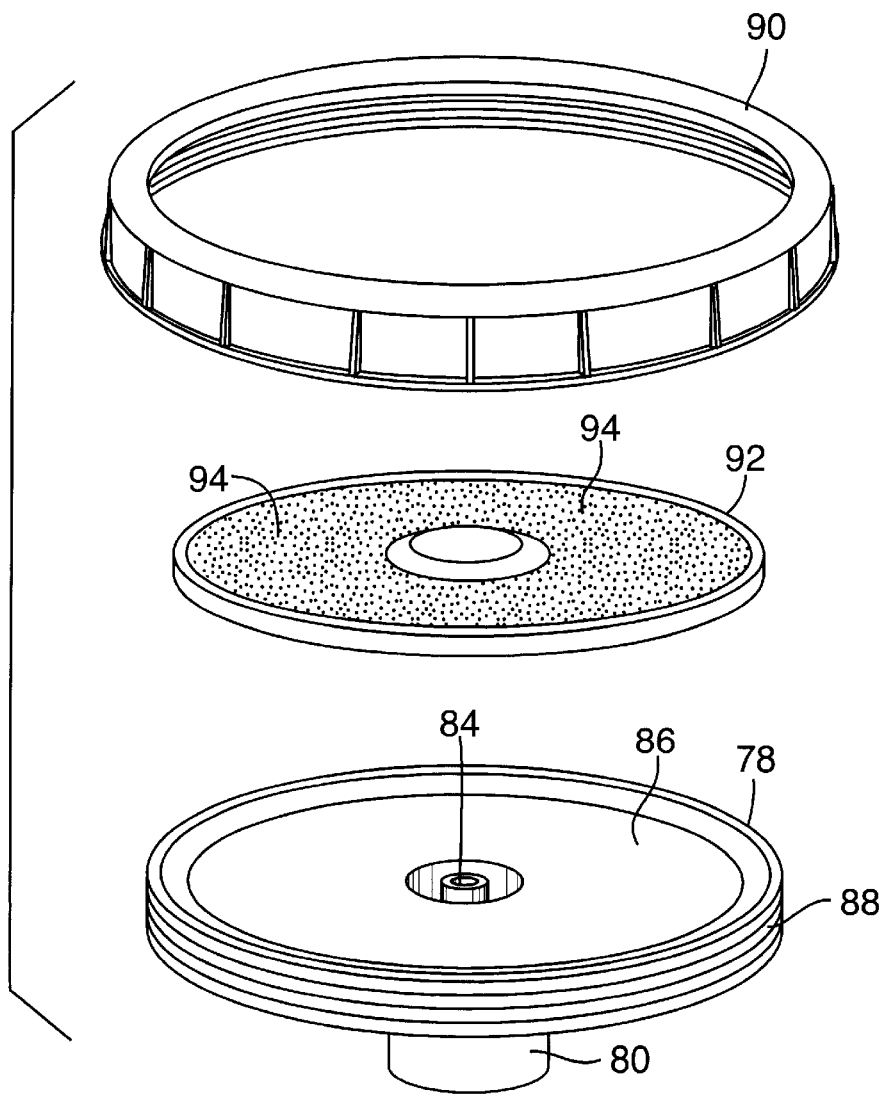

The membrane disk diffusers 34 provide a means for introducing oxygen to the liquid and agitation within the tank and are detailed in FIGS. 4 and 5. Each diffuser 34 includes a main body member 78 that has a downwardly depending nipple 80 that is fitted through an opening formed in the bottom of tank 12 and is fluidly sealed thereto. The manner in which main body member 78 is connected to the tank is not of particular importance provided there is a fluid seal at the connection. The body member could thus be threaded through an opening in the tank or glued in place. Appropriate seals may be used as necessary. The portion of nipple 80 external to tank 12, and which extends below tank 12 includes an internally threaded opening 82 for a sealed connection to a threaded end connector on air line 58. A centrally bored orifice 84 extends completely through nipple 80. On the interior of tank 12, main body member 78 includes a flattened disk portion 86 inwardly of a threaded edge 88. A retaining ring 90 has is threaded to match threaded edge 88 such that ring 90 may be screwed onto body member 78 with a diffuser membrane 92 sealed therebetween. Diffuser membrane 92 is a flexible rubber material having plural small openings 94 such as slits formed completely through the rubber membrane material. When the diffuser modules 34 are assembled as shown in FIG. 4, diffuser membrane 92 is fluidly sealed in the module between the retaining ring 90 and threaded edge 88 by a crushing action between the retaining ring and the flattened disk portion 86.

Membrane disk diffusers suitable for use with the present invention are available from US Filter Company, headquartered in Palm Desert, Calif., and on the web at www.usfilter.com, and are sold under the brand name FLEX-DISC™.

In operation, valve 62, and preferably valves 68 and 74 are closed and tank 12 is filled with water from an external source. Depending upon the water source and the requirements of the particular application, the water may be purified and, again depending on the application, additives such as carbohydrates and other nutritional supplements for microorganisms may be added to the water. Basket tray 24 is then fitted over the upper opening into tank 12 and high quality compost is added to each of the compost baskets 28. The baskets are then inserted into openings 26 in basket tray 24 such that the compost baskets are suspended in the tank interior. The water level 96 in tank 12 (FIG. 2) is such that the compost baskets 28 and the compost contained therein are immersed in the water. Lid 16 is then placed over basket tray 24.

Air pump 18 is connected to a source of electric power and is switched on at a switch 98. Air pump 18 is sized to pump a quantity of air appropriate to the size of the tank and the number of membrane disk diffuser modules. In the preferred embodiment disclosed herein with a tank capacity of about 100 gallons and four membrane disk diffuser modules, and appropriately sized air pump moves about 22 gallons of air per minute and at a working (open) pressure of about 0.15 pounds per square inch. The closed pressure is about 6.5 pounds per square inch. It will be appreciated that these figures are exemplary only, and that many other air pump sizes will be appropriate in a given circumstance. Numerous commercially available air pumps are adequate for use with the present invention. One exemplary model is manufactured by Rolf C. Hagen, Inc. of Montreal, Quebec and sold under the model number A-814. There are many other comparable pumps available on the market. Moreover, while in the preferred embodiment compressed air is supplied from air pump 18, other sources of air may be used such as compressed air from pressurized tanks and the like.

With air pump 18 switched on, air is pumped into and flows through air line 52, into distribution module 56 and into air lines 58, each of which is fluidly connected and sealed to a membrane diffuser module 34 as detailed above. With reference to FIG. 4, air enters the diffuser through nipple 80 and flows in the direction of arrow A through orifice 84 and to the underside of diffuser membrane 92, between the membrane and the flattened disk 86. The air pressure causes diffuser membrane 92 to deflect upwardly as illustrated with phantom lines in FIG. 4. Stated otherwise, the pressure of the air flowing into the diffuser module causes the membrane to inflate. The space defined between the interior surface of the membrane and the disk 86 thus defines a plenum for receiving air from air pump 18. The size of the plenum increases as the amount of air flowing into the plenum increases, and/or the pressure of the air in the system increases. As the membrane inflates, slits 94 open very slightly—enough so that air begins to bubble out of the openings and into the liquid in very small bubbles. Each diffuser membrane 92 includes hundreds of openings 94. As a result, many thousands of small air bubbles are constantly rising through the liquid. This results in efficient mixing action of the liquid.

It will be appreciated that the combination of an air source and the membrane diffuser modules define a highly efficient bubble generator to introduce air bubbles into the liquid, and thus maintain the concentration of dissolved oxygen in the liquid at a desirable high level. It will also be appreciated that there are other equivalent apparatus for introducing air bubbles into tank 12, such as perforate air lines and the like installed in the tank.

Because the bubbles are small and have a high surface area to volume ratio, a high level of dissolved oxygen is maintained in the water. And because the water flows readily through the compost baskets and the filter media the compost is agitated by the bubbling action. This results in efficient extraction of microorganisms from the compost into the water.

Air pump 18 is kept on for a set time period during which bubbles are generated in the tank so that the liquid in the tank is constantly circulating and oxygen is constantly being dissolved into the water. During this period the microorganisms in the liquid, and particularly the aerobic bacteria are reproducing rapidly. The microbial load of the liquid thus increases during this production period due to rapid reproduction of bacteria and other microbes. Because the oxygen concentration in the water is high, desirable aerobic organisms are favored and the growth and reproduction of anaerobic microorganisms is inhibited.

When the production period is complete—typically between about 15 to 30 hours and more preferably about 24 hours, but varying with specific circumstances, the air pump is switched off at control switch 98. With air pump 18 off and the flow of air to the membrane diffuser modules stopped, the diffuser membranes 92 deflate to the flat condition shown in FIG. 4. This causes the slits 94 to close, thereby stopping the backflow of liquid into the air plumbing system.

The finished compost tea is drained off through one or both of the two fluid paths and into appropriate hoses and the like that are attached to outlets 76. If the tea is drained off through the second fluid path, the water pump 72 is switched on at control switch 98. The tea may be filled into appropriate application apparatus for direct application as a foliar spray or for application to soil.

The tea system is easily cleaned and/or sanitized by removing lid 16, basket tray 24 and compost baskets 28. The interior of tank 12 may thus be sprayed out with clean water and sanitizers or soaps as needed. The other components may similarly be cleaned and sanitized. Spent compost is removed from the compost baskets 28 and they are sprayed out and cleaned as needed.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. Compost tea system, comprising:
    a tank defining a tank interior for holding a quantity of liquid therein and having an outlet for draining said liquid from said tank;
    a lid for covering said tank and having an opening formed therethrough;
    a perforate compost basket extending through said opening in said lid and into said tank interior, said basket comprising a mesh defining mesh openings that retain compost in the basket but allow liquid into said basket and allow air bubbles to enter said basket through said mesh;
    at least one bubble generator located in said tank interior and fluidly connected to a source of air, said bubble generator further comprising a flexible membrane having plural openings formed therein and defining a plenum thereunder for receiving air from said source of air, each of said plural openings defining one way openings that allows air to flow through said openings when a flow of air is established from said source of air to said plenum and that close to prevent fluid in said tank from back flowing into said plenum when said flow of air is stopped.

2. The compost tea system according to claim 1 including plural bubble generators located in said tank interior, each fluidly connected to a source of air.

3. The compost tea system according to claim 1 wherein said lid further comprises an inner lid having a plurality of openings formed therethrough and a perforate compost basket extends through each of said plural openings into said tank interior, and an outer lid covering said inner lid.

4. The compost tea system according to claim 3 wherein the inner lid and the outer lid each includes at least one vent.

5. The compost tea system according to claim 1 wherein said outlet is fluidly connected to a drain line to define a drain for removing liquid from said tank, and said drain line includes a first valve for opening and closing said drain.

6. The compost tea system according to claim 5 including a pump in said drain line for actively pumping said fluid from said tank.

7. The compost tea system according to claim 1 wherein said source of air is defined by an air pump.

8. A compost tea producing apparatus comprising:
    a tank having a removable lid with at least one lid opening, said tank configured for containing a volume of liquid;
    a perforate compost basket extending through the lid opening and supported by the lid so that the basket extends into the interior of said tank and into liquid contained in said tank, said basket comprising an inner mesh screen defining a primary filter media and having mesh openings of a first size, an outer mesh screen having mesh openings of a second size and spaced apart from said inner mesh screen to define a space between said inner and outer mesh screens, and a secondary filter media sandwiched between said inner and outer mesh screens in said space, said secondary filter media defining mesh openings smaller than the first and second size mesh openings of the inner mesh screen and outer mesh screen;
    means for generating air bubbles in said tank, wherein said mesh openings of the inner and outer mesh screens and said secondary filter media are sized to allow air bubbles to flow through said mesh openings, and wherein said means for generating air bubbles comprises a flexible membrane located in tank interior and having plural openings formed therein and defining a plenum thereunder, said plenum fluidly connected to a supply of compressed air.

9. The compost tea apparatus according to claim 8 wherein said tank contains a quantity of fluid and said plural openings define one way openings that allow air to flow through said openings when a flow of air is established from said supply of compressed air to said plenum and that close to prevent fluid in said tank from back flowing into said plenum when said flow of air is stopped.

10. The compost tea apparatus according to claim wherein the lid further comprises an inner lid and an outer lid and wherein each of the inner lid and outer lid includes at least one vent.

11. A compost tea system comprising:
    a tank for holding a quantity of fluid;
    a filter basket suspended in said fluid, said filter basket comprising first, second and third filter elements, the first filter element defined by an inner mesh screen defining a primary filter media having mesh openings of a first size, the second filter element defined by an outer mesh screen spaced apart from said inner mesh screen and having mesh openings of a second size, and said third filter element retained between said first and second filter elements, said third filter element defining mesh openings smaller than the first and second size mesh openings of the first and second filter elements;
    a bubble generator comprising a flexible membrane having plural openings formed therein and defining a plenum thereunder for receiving air from a source of air, each of said plural openings defining a slit in said flexible membrane that allows air to flow through said slit when a flow of air is established from said source of air to said plenum and that close to prevent fluid in said tank from back flowing into said plenum when said flow of air is stopped;

a supply of air fluidly connected to said bubble generator.

12. The compost tea system according to claim 11 wherein said filter basket defines a compost-holding basket that is configured for allowing liquid in said tank to circulate through said basket.

13. The compost tea system according to claim 11 including a plurality of said bubble generators.

14. A method for producing compost tea, comprising the steps of:
   (a) filling a tank with a quantity of liquid;
   (b) providing a source of compost;
   (c) introducing said compost into a perforate container configured for allowing liquid and air bubbles to flow through said perforations to agitate said compost in said perforate container but for retaining particulate matter in said compost within said container;
   (d) immersing said perforate container in said liquid;
   (e) bubbling air through said liquid and said perforate container by generating bubbles in said tank to thereby circulate said fluid in said tank and through said perforate container to agitate said compost and to maintain a desired dissolved oxygen concentration in said fluid and to extract microorganisms and nutrients from said compost into said liquid;
   (f) maintaining said bubbling for a period of time sufficient to allow said microorganisms to reproduce.

15. The method according to claim 14 wherein said time period is between about 15 and 30 hours.

16. The method according to claim 14 wherein the concentration of dissolved oxygen in said liquid is maintained at sufficiently high levels to inhibit the growth of anaerobic microorganisms.

* * * * *